US009125278B2

(12) United States Patent
Nathan et al.

(10) Patent No.: US 9,125,278 B2
(45) Date of Patent: Sep. 1, 2015

(54) OLED LUMINANCE DEGRADATION COMPENSATION

(71) Applicant: Ignis Innovation Inc., Waterloo (CA)

(72) Inventors: Arokia Nathan, Cambridge (GB); Gholamreza Chaji, Waterloo (CA)

(73) Assignee: Ignis Innovation Inc., Waterloo (CA)

( * ) Notice: Subject to any disclaimer, the term of this patent is extended or adjusted under 35 U.S.C. 154(b) by 0 days.

(21) Appl. No.: 14/052,146

(22) Filed: Oct. 11, 2013

(65) Prior Publication Data

US 2014/0035488 A1 Feb. 6, 2014

Related U.S. Application Data

(63) Continuation of application No. 13/632,691, filed on Oct. 1, 2012, now Pat. No. 8,581,809, which is a continuation of application No. 13/179,963, filed on Jul. 11, 2011, now Pat. No. 8,279,143, which is a continuation of application No. 11/839,145, filed on Aug. 15, 2007, now Pat. No. 8,026,876.

(51) Int. Cl.

| | |
|---|---|
| ***G06F 3/038*** | (2013.01) |
| ***H05B 33/08*** | (2006.01) |
| ***G09G 3/32*** | (2006.01) |

(52) U.S. Cl.

CPC .......... *H05B 33/0896* (2013.01); *G09G 3/3233* (2013.01); *G09G 2300/0465* (2013.01); *G09G 2300/0842* (2013.01); *G09G 2320/029* (2013.01); *G09G 2320/0295* (2013.01); *G09G 2320/041* (2013.01); *G09G 2320/043* (2013.01); *G09G 2320/045* (2013.01)

(58) Field of Classification Search

CPC .................................. G09G 3/10; G09G 3/32
USPC ........... 315/169.1–169.4; 345/204, 76–81, 84
See application file for complete search history.

(56) References Cited

U.S. PATENT DOCUMENTS

| | | | |
|---|---|---|---|
| 3,506,851 | A | 4/1970 | Polkinghorn et al. |
| 3,774,055 | A | 11/1973 | Bapat et al. |
| 4,090,096 | A | 5/1978 | Nagami |
| 4,160,934 | A | 7/1979 | Kirsch |
| 4,354,162 | A | 10/1982 | Wright |
| 4,943,956 | A | 7/1990 | Noro |
| 4,996,523 | A | 2/1991 | Bell et al. |

(Continued)

FOREIGN PATENT DOCUMENTS

| | | |
|---|---|---|
| CA | 1 294 034 | 1/1992 |
| CA | 2 109 951 | 11/1992 |

(Continued)

OTHER PUBLICATIONS

Ahnood et al.: "Effect of threshold voltage instability on field effect mobility in thin film transistors deduced from constant current measurements"; dated Aug. 2009.

(Continued)

*Primary Examiner* — Minh D A
(74) *Attorney, Agent, or Firm* — Nixon Peabody LLP

(57) ABSTRACT

A system and method are disclosed for determining a pixel capacitance. The pixel capacitance is correlated to a pixel age to determine a current correction factor used for compensating the pixel drive current to account for luminance degradation of the pixel that results from the pixel aging.

17 Claims, 7 Drawing Sheets

(56) References Cited

U.S. PATENT DOCUMENTS

| | | | |
|---|---|---|---|
| 5,153,420 | A | 10/1992 | Hack et al. |
| 5,198,803 | A | 3/1993 | Shie et al. |
| 5,204,661 | A | 4/1993 | Hack et al. |
| 5,266,515 | A | 11/1993 | Robb et al. |
| 5,489,918 | A | 2/1996 | Mosier |
| 5,498,880 | A | 3/1996 | Lee et al. |
| 5,572,444 | A | 11/1996 | Lentz et al. |
| 5,589,847 | A | 12/1996 | Lewis |
| 5,619,033 | A | 4/1997 | Weisfield |
| 5,648,276 | A | 7/1997 | Hara et al. |
| 5,670,973 | A | 9/1997 | Bassetti et al. |
| 5,691,783 | A | 11/1997 | Numao et al. |
| 5,714,968 | A | 2/1998 | Ikeda |
| 5,723,950 | A | 3/1998 | Wei et al. |
| 5,744,824 | A | 4/1998 | Kousai et al. |
| 5,745,660 | A | 4/1998 | Kolpatzik et al. |
| 5,748,160 | A | 5/1998 | Shieh et al. |
| 5,815,303 | A | 9/1998 | Berlin |
| 5,870,071 | A | 2/1999 | Kawahata |
| 5,874,803 | A | 2/1999 | Garbuzov et al. |
| 5,880,582 | A | 3/1999 | Sawada |
| 5,903,248 | A | 5/1999 | Irwin |
| 5,917,280 | A | 6/1999 | Burrows et al. |
| 5,923,794 | A | 7/1999 | McGrath et al. |
| 5,945,972 | A | 8/1999 | Okumura et al. |
| 5,949,398 | A | 9/1999 | Kim |
| 5,952,789 | A | 9/1999 | Stewart et al. |
| 5,952,991 | A | 9/1999 | Akiyama et al. |
| 5,982,104 | A | 11/1999 | Sasaki et al. |
| 5,990,629 | A | 11/1999 | Yamada et al. |
| 6,023,259 | A | 2/2000 | Howard et al. |
| 6,069,365 | A | 5/2000 | Chow et al. |
| 6,091,203 | A | 7/2000 | Kawashima et al. |
| 6,097,360 | A | 8/2000 | Holloman |
| 6,144,222 | A | 11/2000 | Ho |
| 6,177,915 | B1 | 1/2001 | Beeteson et al. |
| 6,229,506 | B1 | 5/2001 | Dawson et al. |
| 6,229,508 | B1 | 5/2001 | Kane |
| 6,246,180 | B1 | 6/2001 | Nishigaki |
| 6,252,248 | B1 | 6/2001 | Sano et al. |
| 6,259,424 | B1 | 7/2001 | Kurogane |
| 6,262,589 | B1 | 7/2001 | Tamukai |
| 6,271,825 | B1 | 8/2001 | Greene et al. |
| 6,288,696 | B1 | 9/2001 | Holloman |
| 6,304,039 | B1 | 10/2001 | Appelberg et al. |
| 6,307,322 | B1 | 10/2001 | Dawson et al. |
| 6,310,962 | B1 | 10/2001 | Chung et al. |
| 6,320,325 | B1 | 11/2001 | Cok et al. |
| 6,323,631 | B1 | 11/2001 | Juang |
| 6,356,029 | B1 | 3/2002 | Hunter |
| 6,373,454 | B1 | 4/2002 | Knapp et al. |
| 6,392,617 | B1 | 5/2002 | Gleason |
| 6,414,661 | B1 | 7/2002 | Shen et al. |
| 6,417,825 | B1 | 7/2002 | Stewart et al. |
| 6,433,488 | B1 | 8/2002 | Bu |
| 6,437,106 | B1 | 8/2002 | Stoner et al. |
| 6,445,369 | B1 | 9/2002 | Yang et al. |
| 6,475,845 | B2 | 11/2002 | Kimura |
| 6,501,098 | B2 | 12/2002 | Yamazaki |
| 6,501,466 | B1 | 12/2002 | Yamagishi et al. |
| 6,522,315 | B2 | 2/2003 | Ozawa et al. |
| 6,525,683 | B1 | 2/2003 | Gu |
| 6,531,827 | B2 | 3/2003 | Kawashima |
| 6,542,138 | B1 | 4/2003 | Shannon et al. |
| 6,580,408 | B1 | 6/2003 | Bae et al. |
| 6,580,657 | B2 | 6/2003 | Sanford et al. |
| 6,583,398 | B2 | 6/2003 | Harkin |
| 6,583,775 | B1 | 6/2003 | Sekiya et al. |
| 6,594,606 | B2 | 7/2003 | Everitt |
| 6,618,030 | B2 | 9/2003 | Kane et al. |
| 6,639,244 | B1 | 10/2003 | Yamazaki et al. |
| 6,668,645 | B1 | 12/2003 | Gilmour et al. |
| 6,677,713 | B1 | 1/2004 | Sung |
| 6,680,580 | B1 | 1/2004 | Sung |
| 6,687,266 | B1 | 2/2004 | Ma et al. |
| 6,690,000 | B1 | 2/2004 | Muramatsu et al. |
| 6,690,344 | B1 | 2/2004 | Takeuchi et al. |
| 6,693,388 | B2 | 2/2004 | Oomura |
| 6,693,610 | B2 | 2/2004 | Shannon et al. |
| 6,697,057 | B2 | 2/2004 | Koyama et al. |
| 6,720,942 | B2 | 4/2004 | Lee et al. |
| 6,724,151 | B2 | 4/2004 | Yoo |
| 6,734,636 | B2 | 5/2004 | Sanford et al. |
| 6,738,034 | B2 | 5/2004 | Kaneko et al. |
| 6,738,035 | B1 | 5/2004 | Fan |
| 6,753,655 | B2 | 6/2004 | Shih et al. |
| 6,753,834 | B2 | 6/2004 | Mikami et al. |
| 6,756,741 | B2 | 6/2004 | Li |
| 6,756,952 | B1 | 6/2004 | Decaux et al. |
| 6,756,958 | B2 | 6/2004 | Furuhashi et al. |
| 6,771,028 | B1 | 8/2004 | Winters |
| 6,777,712 | B2 | 8/2004 | Sanford et al. |
| 6,777,888 | B2 | 8/2004 | Kondo |
| 6,781,567 | B2 | 8/2004 | Kimura |
| 6,806,497 | B2 | 10/2004 | Jo |
| 6,806,638 | B2 | 10/2004 | Lin et al. |
| 6,806,857 | B2 | 10/2004 | Sempel et al. |
| 6,809,706 | B2 | 10/2004 | Shimoda |
| 6,815,975 | B2 | 11/2004 | Nara et al. |
| 6,828,950 | B2 | 12/2004 | Koyama |
| 6,853,371 | B2 | 2/2005 | Miyajima et al. |
| 6,859,193 | B1 | 2/2005 | Yumoto |
| 6,873,117 | B2 | 3/2005 | Ishizuka |
| 6,876,346 | B2 | 4/2005 | Anzai et al. |
| 6,885,356 | B2 | 4/2005 | Hashimoto |
| 6,900,485 | B2 | 5/2005 | Lee |
| 6,903,734 | B2 | 6/2005 | Eu |
| 6,909,243 | B2 | 6/2005 | Inukai |
| 6,909,419 | B2 | 6/2005 | Zavracky et al. |
| 6,911,960 | B1 | 6/2005 | Yokoyama |
| 6,911,964 | B2 | 6/2005 | Lee et al. |
| 6,914,448 | B2 | 7/2005 | Jinno |
| 6,919,871 | B2 | 7/2005 | Kwon |
| 6,924,602 | B2 | 8/2005 | Komiya |
| 6,937,215 | B2 | 8/2005 | Lo |
| 6,937,220 | B2 | 8/2005 | Kitaura et al. |
| 6,940,214 | B1 | 9/2005 | Komiya et al. |
| 6,943,500 | B2 | 9/2005 | LeChevalier |
| 6,947,022 | B2 | 9/2005 | McCartney |
| 6,954,194 | B2 | 10/2005 | Matsumoto et al. |
| 6,956,547 | B2 | 10/2005 | Bae et al. |
| 6,975,142 | B2 | 12/2005 | Azami et al. |
| 6,975,332 | B2 | 12/2005 | Arnold et al. |
| 6,995,510 | B2 | 2/2006 | Murakami et al. |
| 6,995,519 | B2 | 2/2006 | Arnold et al. |
| 7,023,408 | B2 | 4/2006 | Chen et al. |
| 7,027,015 | B2 | 4/2006 | Booth, Jr. et al. |
| 7,027,078 | B2 | 4/2006 | Reihl |
| 7,034,793 | B2 | 4/2006 | Sekiya et al. |
| 7,038,392 | B2 | 5/2006 | Libsch et al. |
| 7,057,359 | B2 | 6/2006 | Hung et al. |
| 7,061,451 | B2 | 6/2006 | Kimura |
| 7,064,733 | B2 | 6/2006 | Cok et al. |
| 7,071,932 | B2 | 7/2006 | Libsch et al. |
| 7,088,051 | B1 | 8/2006 | Cok |
| 7,088,052 | B2 | 8/2006 | Kimura |
| 7,102,378 | B2 | 9/2006 | Kuo et al. |
| 7,106,285 | B2 | 9/2006 | Naugler |
| 7,112,820 | B2 | 9/2006 | Chang et al. |
| 7,116,058 | B2 | 10/2006 | Lo et al. |
| 7,119,493 | B2 | 10/2006 | Fryer et al. |
| 7,122,835 | B1 | 10/2006 | Ikeda et al. |
| 7,127,380 | B1 | 10/2006 | Iverson et al. |
| 7,129,914 | B2 | 10/2006 | Knapp et al. |
| 7,164,417 | B2 | 1/2007 | Cok |
| 7,193,589 | B2 | 3/2007 | Yoshida et al. |
| 7,224,332 | B2 | 5/2007 | Cok |
| 7,227,519 | B1 | 6/2007 | Kawase et al. |
| 7,245,277 | B2 | 7/2007 | Ishizuka |
| 7,248,236 | B2 | 7/2007 | Nathan et al. |
| 7,262,753 | B2 | 8/2007 | Tanghe et al. |
| 7,274,363 | B2 | 9/2007 | Ishizuka et al. |
| 7,301,618 | B2 * | 11/2007 | Cok et al. ...................... 356/218 |
| 7,310,092 | B2 | 12/2007 | Imamura |

(56) References Cited

U.S. PATENT DOCUMENTS 7,315,295 B2 1/2008 Kimura
7,321,348 B2 1/2008 Cok et al.
7,339,560 B2 3/2008 Sun
7,355,574 B1 4/2008 Leon et al.
7,358,941 B2 4/2008 Ono et al.
7,368,868 B2 5/2008 Sakamoto
7,385,572 B2 * 6/2008 Yu et al. .......................... 345/76
7,411,571 B2 8/2008 Huh
7,414,600 B2 8/2008 Nathan et al.
7,423,617 B2 9/2008 Giraldo et al.
7,474,285 B2 1/2009 Kimura
7,502,000 B2 3/2009 Yuki et al.
7,528,812 B2 5/2009 Tsuge et al.
7,535,449 B2 5/2009 Miyazawa
7,554,512 B2 6/2009 Steer
7,569,849 B2 8/2009 Nathan et al.
7,576,718 B2 8/2009 Miyazawa
7,580,012 B2 8/2009 Kim et al.
7,589,707 B2 9/2009 Chou
7,609,239 B2 10/2009 Chang
7,619,594 B2 11/2009 Hu
7,619,597 B2 11/2009 Nathan et al.
7,633,470 B2 12/2009 Kane
7,656,370 B2 2/2010 Schneider et al.
7,800,558 B2 9/2010 Routley et al.
7,847,764 B2 12/2010 Cok et al.
7,859,492 B2 12/2010 Kohno
7,868,859 B2 1/2011 Tomida et al.
7,876,294 B2 1/2011 Sasaki et al.
7,924,249 B2 4/2011 Nathan et al.
7,932,883 B2 4/2011 Klompenhouwer et al.
7,969,390 B2 6/2011 Yoshida
7,978,187 B2 7/2011 Nathan et al.
7,994,712 B2 8/2011 Sung et al.
8,026,876 B2 * 9/2011 Nathan et al. .................. 345/78
8,049,420 B2 11/2011 Tamura et al.
8,077,123 B2 12/2011 Naugler, Jr.
8,115,707 B2 2/2012 Nathan et al.
8,223,177 B2 7/2012 Nathan et al.
8,232,939 B2 7/2012 Nathan et al.
8,259,044 B2 9/2012 Nathan et al.
8,264,431 B2 9/2012 Bulovic et al.
8,279,143 B2 * 10/2012 Nathan et al. .................. 345/78
8,339,386 B2 12/2012 Leon et al.
8,581,809 B2 * 11/2013 Nathan et al. .................. 345/78
2001/0002703 A1 6/2001 Koyama
2001/0009283 A1 7/2001 Arao et al.
2001/0024181 A1 9/2001 Kubota
2001/0024186 A1 9/2001 Kane et al.
2001/0026257 A1 10/2001 Kimura
2001/0030323 A1 10/2001 Ikeda
2001/0040541 A1 11/2001 Yoneda et al.
2001/0043173 A1 11/2001 Troutman
2001/0045929 A1 11/2001 Prache
2001/0052606 A1 12/2001 Sempel et al.
2001/0052940 A1 12/2001 Hagihara et al.
2002/0000576 A1 1/2002 Inukai
2002/0011796 A1 1/2002 Koyama
2002/0011799 A1 1/2002 Kimura
2002/0012057 A1 1/2002 Kimura
2002/0014851 A1 2/2002 Tai et al.
2002/0018034 A1 2/2002 Ohki et al.
2002/0030190 A1 3/2002 Ohtani et al.
2002/0047565 A1 4/2002 Nara et al.
2002/0052086 A1 5/2002 Maeda
2002/0067134 A1 6/2002 Kawashima
2002/0084463 A1 7/2002 Sanford et al.
2002/0101172 A1 8/2002 Bu
2002/0105279 A1 8/2002 Kimura
2002/0117722 A1 8/2002 Osada et al.
2002/0122308 A1 9/2002 Ikeda
2002/0158587 A1 10/2002 Komiya
2002/0158666 A1 10/2002 Azami et al.
2002/0158823 A1 10/2002 Zavracky et al.
2002/0167474 A1 11/2002 Everitt
2002/0180369 A1 12/2002 Koyama
2002/0180721 A1 12/2002 Kimura et al.
2002/0186214 A1 12/2002 Siwinski
2002/0190924 A1 12/2002 Asano et al.
2002/0190971 A1 12/2002 Nakamura et al.
2002/0195967 A1 12/2002 Kim et al.
2002/0195968 A1 12/2002 Sanford et al.
2003/0020413 A1 1/2003 Oomura
2003/0030603 A1 2/2003 Shimoda
2003/0043088 A1 3/2003 Booth et al.
2003/0057895 A1 3/2003 Kimura
2003/0058226 A1 3/2003 Bertram et al.
2003/0062524 A1 4/2003 Kimura
2003/0063081 A1 4/2003 Kimura et al.
2003/0071821 A1 4/2003 Sundahl et al.
2003/0076048 A1 4/2003 Rutherford
2003/0090447 A1 5/2003 Kimura
2003/0090481 A1 5/2003 Kimura
2003/0107560 A1 6/2003 Yumoto et al.
2003/0111966 A1 6/2003 Mikami et al.
2003/0122745 A1 7/2003 Miyazawa
2003/0122813 A1 7/2003 Ishizuki et al.
2003/0142088 A1 7/2003 LeChevalier
2003/0151569 A1 8/2003 Lee et al.
2003/0156101 A1 8/2003 Le Chevalier
2003/0174152 A1 9/2003 Noguchi
2003/0179626 A1 9/2003 Sanford et al.
2003/0197663 A1 10/2003 Lee et al.
2003/0210256 A1 11/2003 Mori et al.
2003/0230141 A1 12/2003 Gilmour et al.
2003/0230980 A1 12/2003 Forrest et al.
2003/0231148 A1 12/2003 Lin et al.
2004/0032382 A1 2/2004 Cok et al.
2004/0066357 A1 4/2004 Kawasaki
2004/0070557 A1 4/2004 Asano et al.
2004/0070565 A1 4/2004 Nayar et al.
2004/0090186 A1 5/2004 Kanauchi et al.
2004/0090400 A1 5/2004 Yoo
2004/0095297 A1 5/2004 Libsch et al.
2004/0100427 A1 5/2004 Miyazawa
2004/0108518 A1 6/2004 Jo
2004/0135749 A1 7/2004 Kondakov et al.
2004/0145547 A1 7/2004 Oh
2004/0150592 A1 8/2004 Mizukoshi et al.
2004/0150594 A1 8/2004 Koyama et al.
2004/0150595 A1 8/2004 Kasai
2004/0155841 A1 8/2004 Kasai
2004/0174347 A1 9/2004 Sun et al.
2004/0174354 A1 9/2004 Ono et al.
2004/0178743 A1 9/2004 Miller et al.
2004/0183759 A1 9/2004 Stevenson et al.
2004/0196275 A1 10/2004 Hattori
2004/0207615 A1 10/2004 Yumoto
2004/0239596 A1 12/2004 Ono et al.
2004/0252089 A1 12/2004 Ono et al.
2004/0257313 A1 12/2004 Kawashima et al.
2004/0257353 A1 12/2004 Imamura et al.
2004/0257355 A1 12/2004 Naugler
2004/0263437 A1 12/2004 Hattori
2004/0263444 A1 12/2004 Kimura
2004/0263445 A1 12/2004 Inukai et al.
2004/0263541 A1 12/2004 Takeuchi et al.
2005/0007355 A1 1/2005 Miura
2005/0007357 A1 1/2005 Yamashita et al.
2005/0017650 A1 1/2005 Fryer et al.
2005/0024081 A1 2/2005 Kuo et al.
2005/0024393 A1 2/2005 Kondo et al.
2005/0030267 A1 2/2005 Tanghe et al.
2005/0057580 A1 3/2005 Yamano et al.
2005/0067970 A1 3/2005 Libsch et al.
2005/0067971 A1 3/2005 Kane
2005/0068270 A1 3/2005 Awakura
2005/0068275 A1 3/2005 Kane
2005/0073264 A1 4/2005 Matsumoto
2005/0083323 A1 4/2005 Suzuki et al.
2005/0088103 A1 4/2005 Kageyama et al.
2005/0110420 A1 5/2005 Arnold et al.
2005/0110807 A1 5/2005 Chang
2005/0140598 A1 6/2005 Kim et al.

(56) References Cited

U.S. PATENT DOCUMENTS

| | | | |
|---|---|---|---|
| 2005/0140610 | A1 | 6/2005 | Smith et al. |
| 2005/0145891 | A1 | 7/2005 | Abe |
| 2005/0156831 | A1 | 7/2005 | Yamazaki et al. |
| 2005/0168416 | A1 | 8/2005 | Hashimoto et al. |
| 2005/0179626 | A1 | 8/2005 | Yuki et al. |
| 2005/0179628 | A1 | 8/2005 | Kimura |
| 2005/0185200 | A1 | 8/2005 | Tobol |
| 2005/0200575 | A1 | 9/2005 | Kim et al. |
| 2005/0206590 | A1 | 9/2005 | Sasaki et al. |
| 2005/0219184 | A1 | 10/2005 | Zehner et al. |
| 2005/0248515 | A1 | 11/2005 | Naugler et al. |
| 2005/0269959 | A1 | 12/2005 | Uchino et al. |
| 2005/0269960 | A1 | 12/2005 | Ono et al. |
| 2005/0280615 | A1 | 12/2005 | Cok et al. |
| 2005/0280766 | A1 | 12/2005 | Johnson et al. |
| 2005/0285822 | A1 | 12/2005 | Reddy et al. |
| 2005/0285825 | A1 | 12/2005 | Eom et al. |
| 2006/0001613 | A1 | 1/2006 | Routley et al. |
| 2006/0007072 | A1 | 1/2006 | Choi et al. |
| 2006/0012310 | A1 | 1/2006 | Chen et al. |
| 2006/0012311 | A1 | 1/2006 | Ogawa |
| 2006/0027807 | A1 | 2/2006 | Nathan et al. |
| 2006/0030084 | A1 | 2/2006 | Young |
| 2006/0038762 | A1 | 2/2006 | Chou |
| 2006/0066533 | A1 | 3/2006 | Sato et al. |
| 2006/0077135 | A1 | 4/2006 | Cok et al. |
| 2006/0082523 | A1 | 4/2006 | Guo et al. |
| 2006/0092185 | A1 | 5/2006 | Jo et al. |
| 2006/0097628 | A1 | 5/2006 | Suh et al. |
| 2006/0097631 | A1 | 5/2006 | Lee |
| 2006/0103611 | A1 | 5/2006 | Choi |
| 2006/0149493 | A1 | 7/2006 | Sambandan et al. |
| 2006/0170623 | A1 | 8/2006 | Naugler, Jr. et al. |
| 2006/0176250 | A1 | 8/2006 | Nathan et al. |
| 2006/0208961 | A1 | 9/2006 | Nathan et al. |
| 2006/0232522 | A1 | 10/2006 | Roy et al. |
| 2006/0244697 | A1 | 11/2006 | Lee et al. |
| 2006/0261841 | A1 | 11/2006 | Fish |
| 2006/0273997 | A1 | 12/2006 | Nathan et al. |
| 2006/0284801 | A1 | 12/2006 | Yoon et al. |
| 2006/0284895 | A1 | 12/2006 | Marcu et al. |
| 2006/0290618 | A1 | 12/2006 | Goto |
| 2007/0001937 | A1 | 1/2007 | Park et al. |
| 2007/0001939 | A1 | 1/2007 | Hashimoto et al. |
| 2007/0008268 | A1 | 1/2007 | Park et al. |
| 2007/0008297 | A1 | 1/2007 | Bassetti |
| 2007/0057873 | A1 | 3/2007 | Uchino et al. |
| 2007/0069998 | A1 | 3/2007 | Naugler et al. |
| 2007/0075727 | A1 | 4/2007 | Nakano et al. |
| 2007/0076226 | A1 | 4/2007 | Klompenhouwer et al. |
| 2007/0080905 | A1 | 4/2007 | Takahara |
| 2007/0080906 | A1 | 4/2007 | Tanabe |
| 2007/0080908 | A1 | 4/2007 | Nathan et al. |
| 2007/0097038 | A1 | 5/2007 | Yamazaki et al. |
| 2007/0097041 | A1 | 5/2007 | Park et al. |
| 2007/0103419 | A1 | 5/2007 | Uchino et al. |
| 2007/0115221 | A1 | 5/2007 | Buchhauser et al. |
| 2007/0182671 | A1 | 8/2007 | Nathan et al. |
| 2007/0236517 | A1 | 10/2007 | Kimpe |
| 2007/0241999 | A1 | 10/2007 | Lin |
| 2007/0273294 | A1 | 11/2007 | Nagayama |
| 2007/0285359 | A1 | 12/2007 | Ono |
| 2007/0290958 | A1 | 12/2007 | Cok |
| 2007/0296672 | A1 | 12/2007 | Kim et al. |
| 2008/0001525 | A1 | 1/2008 | Chao et al. |
| 2008/0001544 | A1 | 1/2008 | Murakami et al. |
| 2008/0036708 | A1 | 2/2008 | Shirasaki et al. |
| 2008/0042942 | A1 | 2/2008 | Takahashi |
| 2008/0042948 | A1 | 2/2008 | Yamashita et al. |
| 2008/0048951 | A1 | 2/2008 | Naugler, Jr. et al. |
| 2008/0055209 | A1 | 3/2008 | Cok |
| 2008/0074413 | A1 | 3/2008 | Ogura |
| 2008/0088549 | A1 | 4/2008 | Nathan et al. |
| 2008/0088648 | A1 * | 4/2008 | Nathan et al. ................. 345/690 |
| 2008/0117144 | A1 | 5/2008 | Nakano et al. |
| 2008/0150847 | A1 | 6/2008 | Kim et al. |
| 2008/0231558 | A1 | 9/2008 | Naugler |
| 2008/0231562 | A1 | 9/2008 | Kwon |
| 2008/0252571 | A1 | 10/2008 | Hente et al. |
| 2008/0290805 | A1 | 11/2008 | Yamada et al. |
| 2008/0297055 | A1 | 12/2008 | Miyake et al. |
| 2009/0058772 | A1 | 3/2009 | Lee |
| 2009/0160743 | A1 | 6/2009 | Tomida et al. |
| 2009/0174628 | A1 | 7/2009 | Wang et al. |
| 2009/0184901 | A1 | 7/2009 | Kwon |
| 2009/0195483 | A1 | 8/2009 | Naugler, Jr. et al. |
| 2009/0201281 | A1 | 8/2009 | Routley et al. |
| 2009/0213046 | A1 | 8/2009 | Nam |
| 2010/0004891 | A1 | 1/2010 | Ahlers et al. |
| 2010/0026725 | A1 | 2/2010 | Smith |
| 2010/0060911 | A1 | 3/2010 | Marcu et al. |
| 2010/0165002 | A1 | 7/2010 | Ahn |
| 2010/0194670 | A1 | 8/2010 | Cok |
| 2010/0207960 | A1 | 8/2010 | Kimpe et al. |
| 2010/0277400 | A1 | 11/2010 | Jeong |
| 2010/0315319 | A1 | 12/2010 | Cok et al. |
| 2011/0069051 | A1 | 3/2011 | Nakamura et al. |
| 2011/0069089 | A1 | 3/2011 | Kopf et al. |
| 2011/0074750 | A1 | 3/2011 | Leon et al. |
| 2011/0149166 | A1 | 6/2011 | Botzas et al. |
| 2011/0227964 | A1 | 9/2011 | Chaji et al. |
| 2011/0293480 | A1 | 12/2011 | Mueller |
| 2012/0056558 | A1 | 3/2012 | Toshiya et al. |
| 2012/0062565 | A1 | 3/2012 | Fuchs et al. |
| 2012/0299978 | A1 | 11/2012 | Chaji |
| 2013/0027381 | A1 | 1/2013 | Nathan et al. |
| 2013/0057595 | A1 | 3/2013 | Nathan et al. |

FOREIGN PATENT DOCUMENTS

| | | | |
|---|---|---|---|
| CA | 2 249 592 | | 7/1998 |
| CA | 2 368 386 | | 9/1999 |
| CA | 2 242 720 | | 1/2000 |
| CA | 2 354 018 | | 6/2000 |
| CA | 2 432 530 | | 7/2002 |
| CA | 2 436 451 | | 8/2002 |
| CA | 2 438 577 | | 8/2002 |
| CA | 2 463 653 | | 1/2004 |
| CA | 2 498 136 | | 3/2004 |
| CA | 2 522 396 | | 11/2004 |
| CA | 2 443 206 | | 3/2005 |
| CA | 2 472 671 | | 12/2005 |
| CA | 2 567 076 | | 1/2006 |
| CA | 2 526 782 | | 4/2006 |
| CA | 2 550 102 | | 4/2008 |
| CN | 1381032 | | 11/2002 |
| CN | 1448908 | | 10/2003 |
| CN | 1760945 | | 4/2006 |
| EP | 0 158 366 | | 10/1985 |
| EP | 1 028 471 | | 8/2000 |
| EP | 1 111 577 | | 6/2001 |
| EP | 1 130 565 | A1 | 9/2001 |
| EP | 1 194 013 | | 4/2002 |
| EP | 1 335 430 | A1 | 8/2003 |
| EP | 1 372 136 | | 12/2003 |
| EP | 1 381 019 | | 1/2004 |
| EP | 1 418 566 | | 5/2004 |
| EP | 1 429 312 | A | 6/2004 |
| EP | 1 465 143 | A | 10/2004 |
| EP | 1 469 448 | A | 10/2004 |
| EP | 1 521 203 | A2 | 4/2005 |
| EP | 1 594 347 | | 11/2005 |
| EP | 1 784 055 | A2 | 5/2007 |
| EP | 1 879 169 | A1 | 1/2008 |
| EP | 1 879 172 | | 1/2008 |
| GB | 2 389 951 | | 12/2003 |
| JP | 1272298 | | 10/1989 |
| JP | 4-042619 | | 2/1992 |
| JP | 6-314977 | | 11/1994 |
| JP | 8-340243 | | 12/1996 |
| JP | 09-090405 | | 4/1997 |
| JP | 10-254410 | | 9/1998 |
| JP | 11-202295 | | 7/1999 |
| JP | 11-219146 | | 8/1999 |

(56) References Cited

FOREIGN PATENT DOCUMENTS

| | | | |
|---|---|---|---|
| JP | 11 231805 | | 8/1999 |
| JP | 11-282419 | | 10/1999 |
| JP | 2000-056847 | | 2/2000 |
| JP | 2000-81607 | | 3/2000 |
| JP | 2001-134217 | | 5/2001 |
| JP | 2001-195014 | | 7/2001 |
| JP | 2002-055654 | | 2/2002 |
| JP | 2002-91376 | | 3/2002 |
| JP | 2002-514320 | | 5/2002 |
| JP | 2002-278513 | | 9/2002 |
| JP | 2002-333862 | | 11/2002 |
| JP | 2003-076331 | | 3/2003 |
| JP | 2003-124519 | | 4/2003 |
| JP | 2003-177709 | | 6/2003 |
| JP | 2003-271095 | | 9/2003 |
| JP | 2003-308046 | | 10/2003 |
| JP | 2003-317944 | | 11/2003 |
| JP | 2004-145197 | | 5/2004 |
| JP | 2004-287345 | | 10/2004 |
| JP | 2005-057217 | | 3/2005 |
| JP | 4-158570 | | 10/2008 |
| KR | 2004-0100887 | | 12/2004 |
| TW | 342486 | | 10/1998 |
| TW | 473623 | B | 1/2002 |
| TW | 485337 | | 5/2002 |
| TW | 502233 | | 9/2002 |
| TW | 538650 | | 6/2003 |
| TW | 1221268 | | 9/2004 |
| TW | 1223092 | | 11/2004 |
| TW | 200727247 | | 7/2007 |
| WO | WO 98/48403 | | 10/1998 |
| WO | WO 99/48079 | | 9/1999 |
| WO | WO 01/06484 | | 1/2001 |
| WO | WO 01/27910 | A1 | 4/2001 |
| WO | WO 01/63587 | A2 | 8/2001 |
| WO | WO 02/067327 | A | 8/2002 |
| WO | WO 03/001496 | A1 | 1/2003 |
| WO | WO 03/034389 | A | 4/2003 |
| WO | WO 03/058594 | A1 | 7/2003 |
| WO | WO 03-063124 | | 7/2003 |
| WO | WO 03/077231 | | 9/2003 |
| WO | WO 2004/003877 | | 1/2004 |
| WO | WO 2004/025615 | A | 3/2004 |
| WO | WO 2004/034364 | | 4/2004 |
| WO | WO 2004/047058 | | 6/2004 |
| WO | WO 2004/104975 | A1 | 12/2004 |
| WO | WO 2005/022498 | | 3/2005 |
| WO | WO 2005/022500 | A | 3/2005 |
| WO | WO 2005/029455 | | 3/2005 |
| WO | WO 2005/029456 | | 3/2005 |
| WO | WO 2005/055185 | | 6/2005 |
| WO | WO 2006/000101 | A1 | 1/2006 |
| WO | WO 2006/053424 | | 5/2006 |
| WO | WO 2006/063448 | A | 6/2006 |
| WO | WO 2006/084360 | | 8/2006 |
| WO | WO 2007/003877 | A | 1/2007 |
| WO | WO 2007/079572 | | 7/2007 |
| WO | WO 2007/120849 | A2 | 10/2007 |
| WO | WO 2009/055920 | | 5/2009 |
| WO | WO 2010/023270 | | 3/2010 |
| WO | WO 2011/041224 | A1 | 4/2011 |

OTHER PUBLICATIONS

Alexander et al.: "Pixel circuits and drive schemes for glass and elastic AMOLED displays"; dated Jul. 2005 (9 pages).
Alexander et al.: "Unique Electrical Measurement Technology for Compensation, Inspection, and Process Diagnostics of AMOLED HDTV"; dated May 2010 (4 pages).
Ashtiani et al.: "AMOLED Pixel Circuit With Electronic Compensation of Luminance Degradation"; dated Mar. 2007 (4 pages).
Chaji et al.: "A Current-Mode Comparator for Digital Calibration of Amorphous Silicon AMOLED Displays"; dated Jul. 2008 (5 pages).
Chaji et al.: "A fast settling current driver based on the CCII for AMOLED displays"; dated Dec. 2009 (6 pages).
Chaji et al.: "A Low-Cost Stable Amorphous Silicon AMOLED Display with Full V~T- and V~O~L~E~D Shift Compensation"; dated May 2007 (4 pages).
Chaji et al.: "A low-power driving scheme for a-Si:H active-matrix organic light-emitting diode displays"; dated Jun. 2005 (4 pages).
Chaji et al.: "A low-power high-performance digital circuit for deep submicron technologies"; dated Jun. 2005 (4 pages).
Chaji et al.: "A novel a-Si:H AMOLED pixel circuit based on short-term stress stability of a-Si:H TFTs"; dated Oct. 2005 (3 pages).
Chaji et al.: "A Novel Driving Scheme and Pixel Circuit for AMOLED Displays"; dated Jun. 2006 (4 pages).
Chaji et al.: "A Novel Driving Scheme for High Resolution Large-area a-Si:H AMOLED displays"; dated Aug. 2005 (3 pages).
Chaji et al.: "A Stable Voltage-Programmed Pixel Circuit for a-Si:H AMOLED Displays"; dated Dec. 2006 (12 pages).
Chaji et al.: "A Sub-μA fast-settling current-programmed pixel circuit for AMOLED displays"; dated Sep. 2007.
Chaji et al.: "An Enhanced and Simplified Optical Feedback Pixel Circuit for AMOLED Displays"; dated Oct. 2006.
Chaji et al.: "Compensation technique for DC and transient instability of thin film transistor circuits for large-area devices"; dated Aug. 2008.
Chaji et al.: "Driving scheme for stable operation of 2-TFT a-Si AMOLED pixel"; dated Apr. 2005 (2 pages).
Chaji et al.: "Dynamic-effect compensating technique for stable a-Si:H AMOLED displays"; dated Aug. 2005 (4 pages).
Chaji et al.: "Electrical Compensation of OLED Luminance Degradation"; dated Dec. 2007 (3 pages).
Chaji et al.: "eUTDSP: a design study of a new VLIW-based DSP architecture"; dated My 2003 (4 pages).
Chaji et al.: "Fast and Offset-Leakage Insensitive Current-Mode Line Driver for Active Matrix Displays and Sensors"; dated Feb. 2009 (8 pages).
Chaji et al.: "High Speed Low Power Adder Design With a New Logic Style: Pseudo Dynamic Logic (SDL)"; dated Oct. 2001 (4 pages).
Chaji et al.: "High-precision, fast current source for large-area current-programmed a-Si flat panels"; dated Sep. 2006 (4 pages).
Chaji et al.: "Low-Cost AMOLED Television with IGNIS Compensating Technology"; dated May 2008 (4 pages).
Chaji et al.: "Low-Cost Stable a-Si:H AMOLED Display for Portable Applications"; dated Jun. 2006 (4 pages).
Chaji et al.: "Low-Power Low-Cost Voltage-Programmed a-Si:H AMOLED Display"; dated Jun. 2008 (5 pages).
Chaji et al.: "Merged phototransistor pixel with enhanced near infrared response and flicker noise reduction for biomolecular imaging"; dated Nov. 2008 (3 pages).
Chaji et al.: "Parallel Addressing Scheme for Voltage-Programmed Active-Matrix OLED Displays"; dated May 2007 (6 pages).
Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
Chaji et al.: "Stable Pixel Circuit for Small-Area High-Resolution a-Si:H AMOLED Displays"; dated Oct. 2008 (6 pages).
Chaji et al.: "Stable RGBW AMOLED display with OLED degradation compensation using electrical feedback"; dated Feb. 2010 (2 pages).
Chaji et al.: "Thin-Film Transistor Integration for Biomedical Imaging and AMOLED Displays"; dated 2008 (177 pages).
European Search Report for EP Application No. EP 10166143, dated Sep. 3, 2010 (2 pages).
European Search Report for European Application No. EP 11739485.8-1904 dated Aug. 6, 2013, (14 pages).
European Search Report for European Application No. EP 011122313 dated Sep. 14, 2005 (4 pages).
Supplemental European Search Report for European Application No. EP 04786661 dated Mar. 9, 2009.
Supplemental European Search Report for European Application No. EP 05759141 dated Oct. 30, 2009 (2 pages).
European Search Report for European Application No. EP 05819617 dated Jan. 30, 2009.

(56) References Cited

OTHER PUBLICATIONS

European Search Report for European Application No. EP 06 70 5133 dated Jul. 18, 2008.
European Search Report for European Application No. EP 06721798 dated Nov. 12, 2009 (2 pages).
European Search Report for European Application No. EP 07719579 dated May 20, 2009.
Supplemental European Search Report for European Application No. EP 07815784 dated Jul. 20, 2010 (2 pages).
European Search Report for European Application No. EP 07710608.6 dated Mar. 19, 2010 (7 pages).
European Search Report, Application No. EP 10834294.0-1903, dated Apr. 8, 2013, (9 pages).
European Supplementary Search Report corresponding to European Application No. EP 04786662 dated Jan. 19, 2007 (2 pages).
Extended European Search Report mailed Apr. 27, 2011 issued during prosecution of European patent application No. EP 09733076.5 (13 pages).
Extended European Search Report mailed Jul. 11, 2012 which issued in corresponding European Patent Application No. EP 11191641.7 (14 pages).
Extended European Search Report mailed Nov. 29, 2012, issued in European Patent Application No. EP 11168677.0 (13 page).
Fossum, Eric R.. "Active Pixel Sensors: Are CCD's Dinosaurs?" SPIE: Symposium on Electronic Imaging. Feb. 1, 1993 (13 pages).
International Preliminary Report on Patentability for International Application No. PCT/CA2005/001007 dated Oct. 16, 2006, 4 pages.
International Search Report corresponding to International Application No. PCT/IB2011/050502, dated Jun. 27, 2011 (6 pages).
International Search Report corresponding to International Application No. PCT/CA2004/001742, Canadian Patent Office, dated Feb. 21, 2005 (2 pages).
International Search Report corresponding to International Application No. PCT/IB2010/055541 filed Dec. 1, 2010, dated May 26, 2011; 5 pages.
International Search Report corresponding to International Application No. PCT/IB2011/055135, Canadian Patent Office, dated Apr. 16, 2012 (5 pages).
International Search Report for Application No. PCT/IB2010/055486, Dated Apr. 19, 2011, 5 pages.
International Search Report for International Application No. PCT/CA2005/001007 dated Oct. 18, 2005.
International Search Report for International Application No. PCT/CA2007/000652 dated Jul. 25, 2007.
European Search Report for European Application No. PCT/CA2006/000177 dated Jun. 2, 2006.
International Search Report for International Application No. PCT/CA2004/001741 dated Feb. 21, 2005.
International Search Report for PCT Application No. PCT/CA2009/001769, dated Apr. 8, 2010 (3 pages).
International Search Report mailed Dec. 3, 2002, issued in International Patent Application No. PCT/JP02/09668 (4 pages).
International Search Report mailed Jul. 30, 2009 for International Application No. PCT/CA2009/000501 (4 pages).
International Search Report mailed Mar. 21, 2006 issued in International Patent Application No. PCT/CA2005/001897 (2 pages).
International Search Report, PCT/IB2012/052372, mailed Sep. 12, 2012 (3 pages).
International Searching Authority Search Report, PCT/IB2010/055481, dated Apr. 7, 2011, 3 pages.
International Searching Authority Search Report, PCT/IB2011/051103, dated Jul. 8, 2011, 3 pages.
International Searching Authority Written Opinion, PCT/IB2010/055481, dated Apr. 7, 2011, 6 pages.
International Searching Authority Written Opinion, PCT/IB2011/051103, dated Jul. 8, 2011, 6 pages.
International Written Opinion corresponding to International Application No. PCT/CA2004/001742, Canadian Patent Office, dated Feb. 21, 2005 (5 pages).
International Written Opinion corresponding to International Application No. PCT/IB2011/055135, Canadian Patent Office, dated Apr. 16, 2012 (5 pages).
International Written Opinion for Application No. PCT/IB2010/055486, Dated Apr. 19, 2011, 8 pages.
International Written Opinion for International Application No. PCT/CA2009/000501 mailed Jul. 30, 2009 (6 pages).
International Written Opinion mailed Mar. 21, 2006 corresponding to International Patent Application No. PCT/CA2005/001897 (4 pages).
International Written Opinion of the International Searching Authority corresponding to International Application No. PCT/IB2011/050502, dated Jun. 27, 2011 (7 pages).
International Written Opinion of the International Searching Authority corresponding to International Application No. PCT/IB2010/055541, dated May 26, 2011; 6 pages.
International Written Opinion, PCT/IB2012/052372, mailed Sep. 12, 2012 (6 pages).
Jafarabadiashtiani et al.: "A New Driving Method for a-Si AMOLED Displays Based on Voltage Feedback"; dated 2005 (4 pages).
Kanicki, J. et al. "Amorphous Silicon Thin-Film Transistors Based Active-Matrix Organic Light-Emitting Displays." Asia Display: International Display Workshops, Sep. 2001 (pp. 315-318).
Karim, K. S., et al. "Amorphous Silicon Active Pixel Sensor Readout Circuit for Digital Imaging." IEEE: Transactions on Electron Devices. vol. 50, No. 1, Jan. 2003 (pp. 200-208).
Lee et al.: "Ambipolar Thin-Film Transistors Fabricated by PECVD Nanocrystalline Silicon"; dated 2006.
Lee, Wonbok: "Thermal Management in Microprocessor Chips and Dynamic Backlight Control in Liquid Crystal Displays", Ph.D. Dissertation, University of Southern California (124 pages).
Ma E Y et al.: "Organic light emitting diode/thin film transistor integration for foldable displays" dated Sep. 15, 1997(4 pages).
Matsueda y et al.: "35.1: 2.5-in. AMOLED with Integrated 6-bit Gamma Compensated Digital Data Driver"; dated May 2004.
Mendes E., et al. "A High Resolution Switch-Current Memory Base Cell." IEEE: Circuits and Systems. vol. 2, Aug. 1999 (pp. 718-721).
Nathan A. et al., "Thin Film imaging technology on glass and plastic" ICM 2000, proceedings of the 12 international conference on microelectronics, dated Oct. 31, 2001 (4 pages).
Nathan et al., "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.
Nathan et al.: "Backplane Requirements for active Matrix Organic Light Emitting Diode Displays,"; dated 2006 (16 pages).
Nathan et al.: "Call for papers second international workshop on compact thin-film transistor (TFT) modeling for circuit simulation"; dated Sep. 2009 (1 page).
Nathan et al.: "Driving schemes for a-Si and LTPS AMOLED displays"; dated Dec. 2005 (11 pages).
Nathan et al.: "Invited Paper: a-Si for AMOLED—Meeting the Performance and Cost Demands of Display Applications (Cell Phone to HDTV)", dated 2006 (4 pages).
Office Action in Japanese patent application No. JP2006-527247 dated Mar. 15, 2010. (8 pages).
Office Action in Japanese patent application No. JP2007-545796 dated Sep. 5, 2011. (8 pages).
Partial European Search Report mailed Mar. 20, 2012 which issued in corresponding European Patent Application No. EP 11191641.7 (8 pages).
Partial European Search Report mailed Sep. 22, 2011 corresponding to European Patent Application No. EP 11168677.0 (5 pages).
Philipp: "Charge transfer sensing" Sensor Review, vol. 19, No. 2, Dec. 31, 1999, 10 pages.
Rafati et al.: "Comparison of a 17 b multiplier in Dual-rail domino and in Dual-rail D L (D L) logic styles"; dated 2002 (4 pages).
Safavian et al.: "Three-TFT image sensor for real-time digital X-ray imaging"; dated Feb. 2, 2006 (2 pages).
Safavian et al.: "3-TFT active pixel sensor with correlated double sampling readout circuit for real-time medical x-ray imaging"; dated Jun. 2006 (4 pages).

(56) References Cited

OTHER PUBLICATIONS

Safavian et al.: "A novel current scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Search Report for Taiwan Invention Patent Application No. 093128894 dated May 1, 2012. (1 page).
Search Report for Taiwan Invention Patent Application No. 94144535 dated Nov. 1, 2012. (1 page).
Spindler et al., System Considerations for RGBW OLED Displays, Journal of the SID 14/1, 2006, pp. 37-48.
Stewart M. et al., "polysilicon TFT technology for active matrix oled displays" IEEE transactions on electron devices, vol. 48, No. 5, dated May 2001 (7 pages).
Vygranenko et al.: "Stability of indium-oxide thin-film transistors by reactive ion beam assisted deposition"; dated 2009.
Wang et al.: "Indium oxides by reactive ion beam assisted evaporation: From material study to device application"; dated Mar. 2009 (6 pages).
Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.
Yu, Jennifer: "Improve OLED Technology for Display", Ph.D. Dissertation, Massachusetts Institute of Technology, Sep. 2008 (151 pages).
Extended European Search Report mailed Aug. 6, 2013, issued in European Patent Application No. 11739485.8 (14 pages).
International Search Report corresponding to co-pending International Patent Application Serial No. PCT/IB2013/054251, Canadian Intellectual Property Office, dated Sep. 11, 2013; (4 pages).
International Written Opinion corresponding to co-pending International Patent Application Serial No. PCT/IB2013/054251, Canadian Intellectual Property Office, dated Sep. 11, 2013; (5 pages).

* cited by examiner

OLED LUMINANCE DEGRADATION COMPENSATION

CROSS REFERENCE TO RELATED APPLICATIONS

This application is a continuation of U.S. patent application Ser. No. 13/632,691, filed Oct. 1, 2012, now allowed, which is a continuation of U.S. patent application Ser. No. 13/179,963, filed Jul. 11, 2011, now U.S. Pat. No. 8,279,143, issued Oct. 2, 2012, which is a continuation of U.S. patent application Ser. No. 11/839,145, filed Aug. 15, 2007, now U.S. Pat. No. 8,026,876, issued Sep. 27, 2011, which claims priority to Canadian Patent Application No. 2,556,961, filed Aug. 15, 2006; the entire contents of which are incorporated herein by reference.

FIELD OF THE INVENTION

The present invention relates to OLED displays, and in particular to the compensation of luminance degradation of the OLED based on OLED capacitance.

BACKGROUND

Organic light emitting diodes ("OLEDs") are known to have many desirable qualities for use in displays. For example, they can produce bright displays, they can be manufactured on flexible substrates, they have low power requirements, and they do not require a backlight. OLEDs can be manufactured to emit different colours of light. This makes possible their use in full colour displays. Furthermore, their small size allows for their use in high resolution displays.

The use of OLEDs in displays is currently limited by, among other things, their longevity. As the OLED display is used, the luminance of the display decreases. In order to produce a display that can produce the same quality of display output repeatedly over a period of time (for example, greater then 1000 hours) it is necessary to compensate for this degradation in luminance.

One method of determining the luminance degradation is by measuring it directly. This method measures the luminance of a pixel for a given driving current. This technique requires a portion of each pixel to be covered by the light detector. This results in a lower aperture and resolution.

Another technique is to predict the luminance degradation based on the accumulated drive current applied to the pixel. This technique suffers in that if the information pertaining to the accumulated drive current is lost or corrupted (such as by power failure) the luminance correction cannot be performed.

There is therefore a need for a method and associated system for determining the luminance degradation of an OLED that does not result in a decrease in the aperture ratio, yield or resolution and that does not rely on information about the past operation of the OLED to compensate for the degradation.

SUMMARY

In one embodiment there is provided a method of compensating for luminance degradation of a pixel. The method comprises determining the capacitance of the pixel, and correlating the determined capacitance of the pixel to a current correction factor for the pixel.

In another embodiment there is provided a method of driving a pixel with a current compensated for luminance degradation of the pixel. The method comprises determining the capacitance of the pixel, correlating the determined capacitance of the pixel to a current correction factor for the pixel, compensating a pixel drive current according to the current correction factor, and driving the pixel with the compensated current.

In yet another embodiment there is provided a read block for use in determining a pixel capacitance of a plurality of pixel circuits. The pixel circuits are arranged in an array to form a display. The read block comprises a plurality of read block elements. Each read block element comprises a switch for electrically connecting and disconnecting the read block element to a pixel circuit of the plurality of pixels circuits, an operational amplifier electrically connected to the switch and a read capacitor connected in parallel with the operational amplifier.

In still another embodiment there is provided a display for driving an array of a plurality of pixel circuits with a current compensated for luminance degradation. The display comprises a display panel comprising the array of pixel circuits, the pixel circuits arranged in at least one row and a plurality of columns, a column driver for driving the pixel circuits with a driving current, a read block for determining a pixel capacitance of the pixel circuits, and a control block for controlling the operation of the column driver and the read block, the control block operable to determine a current correction factor from the determined pixel capacitance and to adjust the driving current based on the current correction factor.

BRIEF DESCRIPTION OF THE DRAWINGS

Features and embodiments will be described with reference to the drawings wherein.

DETAILED DESCRIPTION

Figure 1:
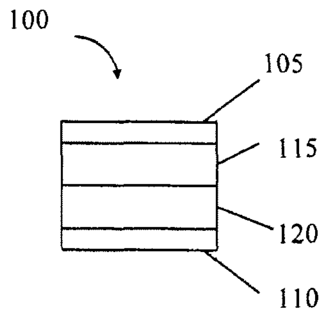
FIG. 1 is a block diagram illustrating the structure of an organic light emitting diode.

FIG. 1 shows, in a block diagram, the structure of an organic light emitting diode ("OLED") 100. The OLED 100 may be used as a pixel in a display device. The following description refers to pixels, and will be appreciated that the pixel may be an OLED. The OLED 100 comprises two electrodes, a cathode 105 and an anode 110. Sandwiched between the two electrodes are two types of organic material. The organic material connected to the cathode 105 is an emissive layer and is typically referred to as a hole transport layer 115. The organic material connected to the anode 110 is a conductive layer and is typically referred to as an electron transport layer 120. Holes and electrons may be injected into the organic materials at the electrodes 105, 110. The holes and electrons recombine at the junction of the two organic materials 115, 120 resulting in the emission of light.

The anode 110 may be made of a transparent material such as indium tin oxide. The cathode 105 does not need to be made of a transparent material. It is typically located on the back of the display panel, and may be referred to as the back plane electronics. In addition to the cathode 105, the back plane electronics may also include transistors and other elements used to control the functioning of the individual pixels.

Figure 2:
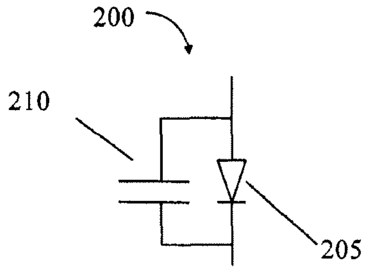
FIG. 2 is a schematic illustrating a circuit model of an OLED pixel.

FIG. 2 shows, in a schematic, a circuit model of an OLED pixel 200. The pixel may be modeled by an ideal diode 205 connected in parallel with a capacitor 210 having a capacitance $C_{oled}$. The capacitance is a result of the physical and electrical characteristics of the OLED. When a current passes through the diode 205 (if the diode is an LED) light is emitted. The intensity of the light emitted (the luminance of the pixel) depends on at least the age of the OLED and the current driving the OLED. As OLEDs age, as a result of being driven by a current for periods of time, the amount of current required to produce a given luminance increases.

In order to produce a display that can reproduce an output consistently over a period of time, the amount of driving current necessary to produce a given luminance must be determined. This requires accounting for the luminance degradation resulting from the aging of the pixel. For example, if a display is to produce an output of X cd/m$^2$ in brightness for 1000 hours, the amount of current required to drive each pixel in the display will increase as the pixels of the display age. The amount that the current must be increased by to produce the given luminance is referred to herein as a current correction factor. The current correction factor may be an absolute amount of current that needs to be added to the signal current in order to provide the compensated driving current to the pixel. Alternatively the current correction factor may be a multiplier. This multiplier may indicate for example that the signal current be doubled to account for the pixel aging. Alternatively the current correction factor may be used in a manner similar to a lookup table to directly correlate a signal current (or desired luminance) with a compensated driving current necessary to produce the desired luminance level in the aged pixel.

As described further herein it is possible to use the change of the pixel's capacitance over time as a feedback signal to stabilize the degradation of the pixel's luminance.

Figure 3A:
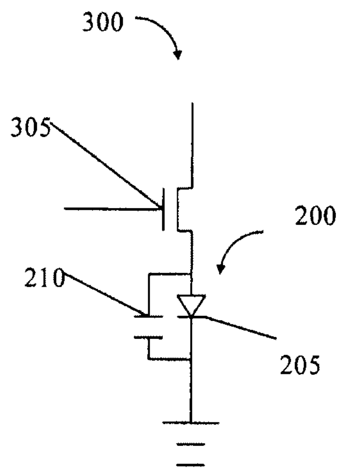
FIG. 3*a* is a schematic illustrating a simplified pixel circuit that can be used in a display.

FIG. 3*a* shows, in a schematic, a simplified pixel circuit 300 that can be used for driving a pixel 200. The transistor 305 acts as a switch for turning on the pixel 200 (shown in FIG. 2). A driving current passes through the transistor 305 to drive the output of the pixel 200.

Figure 3B:
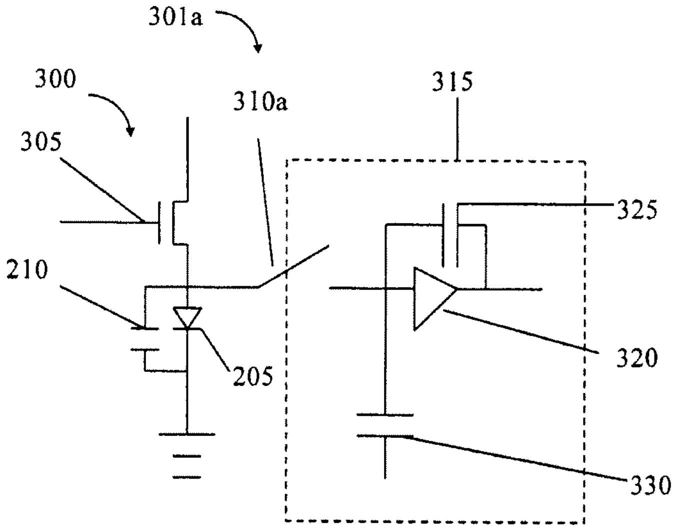
FIG. 3*b* is a schematic illustrating a modified and simplified pixel circuit.

FIG. 3*b* shows, in a schematic, a simplified pixel circuit 301*a*, which has been modified in accordance with methods of present invention. A read block 315 is connected to the pixel circuit 300 of FIG. 3*a* through a switch 310*a*. The read block 315 allows for the capacitance 210 of the pixel 200 to be determined. The read block 315 comprises an op amp 320 connected in parallel with a reading block capacitor 325. This configuration may be referred to as a charge amplifier. The circuit also has an inherent parasitic capacitance 330. The circuit elements of the read block 315 may be implemented in the display panel's back plane electronics. Alternatively, the read block elements may be implemented off the display panel. In one embodiment the read block 315 is incorporated into the column driving circuitry of the display.

If the read block 315 circuitry is implemented separately from the back plane circuitry of the display panel, the switch 310*a* may be implemented in the back plane electronics. Alternatively, the switch 310*a* may also be implemented in the separate read block 315. If the switch 310*a* is implemented in the separate read block 315 it is necessary to provide an electrical connection between the switch 310*a* and the pixel circuit 300.

Figure 3C:
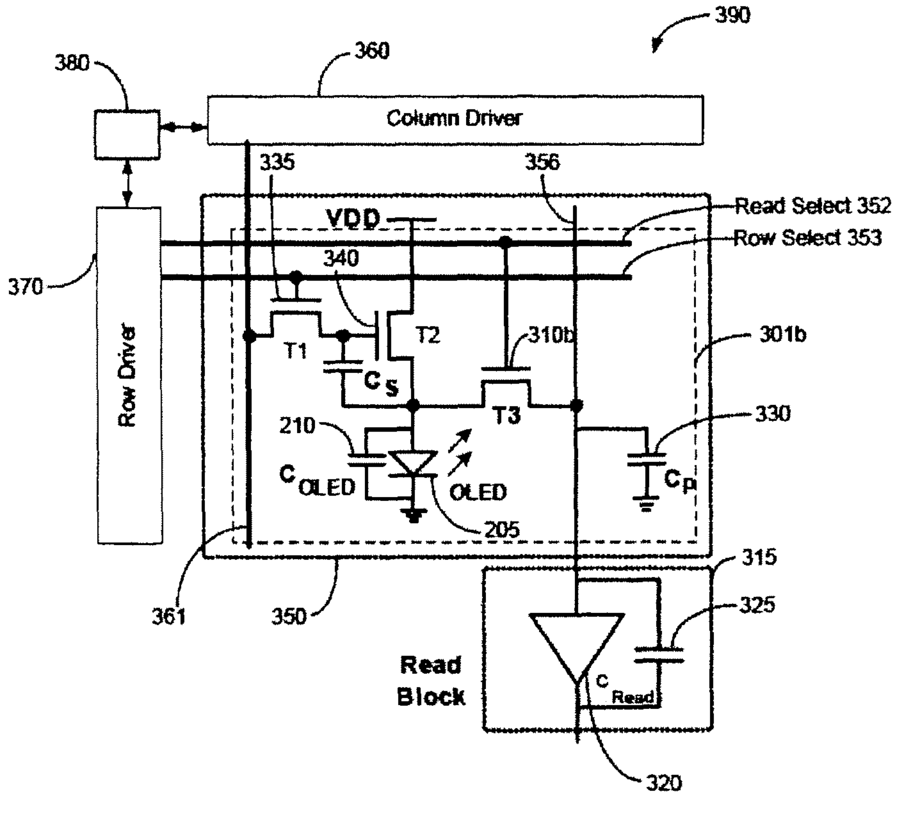
FIG. 3*c* is a schematic illustrating a display, comprising a single pixel.

FIG. 3*c* shows, in a schematic, a display 390, comprising a single pixel circuit 301*b* for clarity of the description. The display 390 comprises a row driver 370, a column driver 360, a control block 380, a display panel 350 and a read block 315. The read block 315 is shown as being a separate component. As previously described, it will be appreciated that the read block circuitry may be incorporated into the other components of the display 390.

The single transistor 305 controlling the driving of the pixel 200 shown in FIG. 3*b* is replaced with two transistors. The first transistor T1 335 acts as a switching transistor controlled by the row drivers 370. The second transistor T2 340 acts as a driving transistor to supply the appropriate current to the pixel 200. When T1 335 is turned on it allows the column drivers 360 to drive the pixel of pixel circuit 301*b* with the drive current (compensated for luminance degradation) through transistor T2 340. The switch 310*a* of FIG. 3*b* has been replaced with a transistor T3 310*b*. The control block 380 controls transistor T3 310*b*. Transistor T3 310*b* may be turned on and off to electrically connect the read block 315 to the pixel circuit.

The Row Select 353 and Read Select 352 lines may be driven by the row driver 370. The Row Select line 353 controls when a row of pixels is on. The Read Select line 352 controls the switch (transistor T3) 310 that connects the read block 315 with the pixel circuit. The Column Driver line 361 is driven by the column driver 360. The Column Driver line 361 provides the compensated driving current for driving the pixel 200 brightness. The pixel circuit also comprises a Read Block line 356. The pixel circuit is connected to the Read Block line 356 by the transistor T3 310*b*. The Read Block line 356 connects the pixel circuit to the read block 315.

The control block 380 of the display 390 controls the functioning of the various blocks of the display 390. The column driver 360 provides a driving current to the pixel 200. It will be appreciated that the current used to drive the pixel 200 determines the brightness of the pixel 200. The row drivers 370 determine which row of pixels will be driven by the column drivers 360 at a particular time. The control block 380 coordinates the column 360 and row drivers 370 so that a row of pixels is turned on and driven by an appropriate current at the appropriate time to produce a desired output. By controlling the row 370 and column drivers 360 (for example, when a particular row is turned on and what current drives each pixel in the row) the control block 380 controls the overall functioning of the display panel 350.

The display 390 of FIG. 3*c* may operate in at least two modes. The first mode is a typical display mode, in which the control block 380 controls the row 370 and column drivers 360 to drive the pixels 200 for displaying an appropriate output. In the display mode the read block 315 is not electrically connected to the pixel circuits as the control block 380 controls transistor T3 310*b* so that the transistor T3 310*b* is off. The second mode is a read mode, in which the control block 380 also controls the read block 315 to determine the capacitance of the pixel 200. In the read mode, the control block 380 turns on and off transistor T3 310*b* as required.

Figure 4:
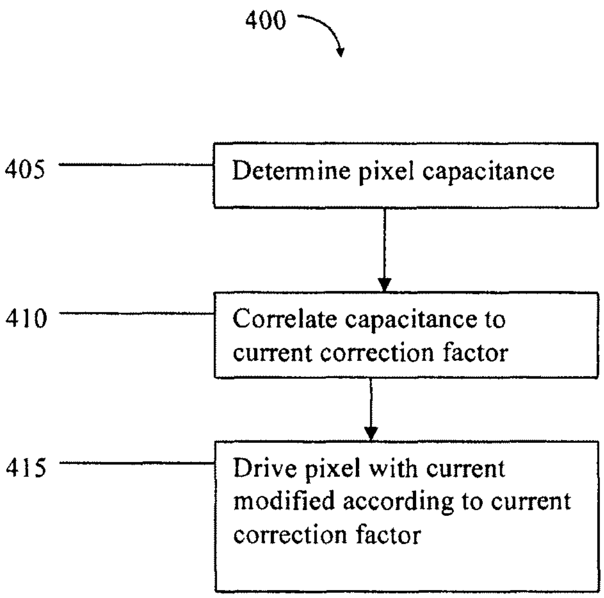
FIG. 4 is a flow diagram illustrating the steps for driving a pixel with a current compensated to account for the luminance degradation of the pixel.

FIG. 4 shows, in a flow diagram 400, the steps for driving a pixel with a current compensated to account for the luminance degradation of the pixel. The capacitance of the pixel is determined in step 405. The determined capacitance is then correlated to a current correction factor in step 410. This correlation may be done in various ways, such as through the solving of equations modeling the aging of the pixel type, or through a lookup means for directly correlating a capacitance to a current correction factor in step 415.

When determining the capacitance of a pixel of a display as shown in FIG. 3*c*, the switch is initially closed (transistor T3 310*b* is on), electrically connecting the pixel circuit to the read block 315 through the Read Block line 356, and the capacitance 210 of the pixel is charged to an initial voltage V1 determined by the bias voltage of the read block 315 (e.g. charge amplifier). The switch is then opened (transistor T3 is turned off), disconnecting the pixel circuit from the Read Block line 356 and in turn the read block 315. The parasitic capacitance 330 of the read block 315 (or Read Block line 356) is then charged to another voltage V2, determined by the bias voltage of the read block 315 (e.g. charge amplifier). The bias voltage of read block 315 (e.g. charge amplifier) is controlled by the control block 380, and may therefore be different from the voltage used to charge the pixel capacitance 210. Finally, the switch is closed again, electrically connecting the read block 315 to the pixel circuit. The pixel capacitance 210 is then charged to V2. The amount of charge required to change the voltage at Cored from V1 to V2 is stored in the read capacitor 325 which can be read as a voltage.

The accuracy of the method may be increased by waiting for a few micro seconds between the time the parasitic capacitance 330 is charged to voltage V2 and when the switch 310 is closed to electrically connect the read block 315 to the pixel circuit. In the few microseconds the leakage current of the read capacitor 315 can be measured, a resultant voltage determined and deducted from the final voltage seen across the read capacitor 315.

The change in voltage across the read capacitor 315 is measured once the switch 310 is closed. Once the pixel capacitance 210 and the parasitic capacitance 330 are charged to the same voltage, the voltage change across the read capacitor 325 may be used to determine the capacitance 210 of the pixel 200. The voltage change across the read capacitor 325 changes according to the following equation:

where $$\Delta Vc_{read} = -\frac{C_{oled}}{C_{read}}(V1 - V2)$$

$\Delta V_{Cread}$ is the voltage change across the read capacitor 325 from when the switch 310 is closed, connecting the charged parasitic 330 and pixel capacitances 210, to when the voltage across the two capacitances is equal;

$C_{oled}$ is the capacitance 210 of the pixel (in this case an OLED);

$C_{read}$ is the capacitance of the read capacitor 325;

V1 is the voltage that the pixel capacitance 210 is initially charged to; and V2 is the voltage that the parasitic capacitance 330 is charged to once the switch is opened.

The voltages V1 and V2 will be known and may be controlled by the control block 380. $C_{read}$ is known and may be selected as required to meet specific circuit design requirements. $\Delta C_{read}$ is measured from the output of the op amp 320. From the above equation, it is clear that as $C_{oled}$ decreases, $\Delta VC_{read}$ decreases as well. Furthermore the gain is determined by V1, V2 and $C_{read}$. The values of V1 and V2 may be controlled by the control block 380 (or wherever the circuit is that controls the voltage). It will be appreciated that the measurement may be made by converting the analog signal of the op amp 320 into a digital signal using techniques known by those skilled in the art.

Figure 5:
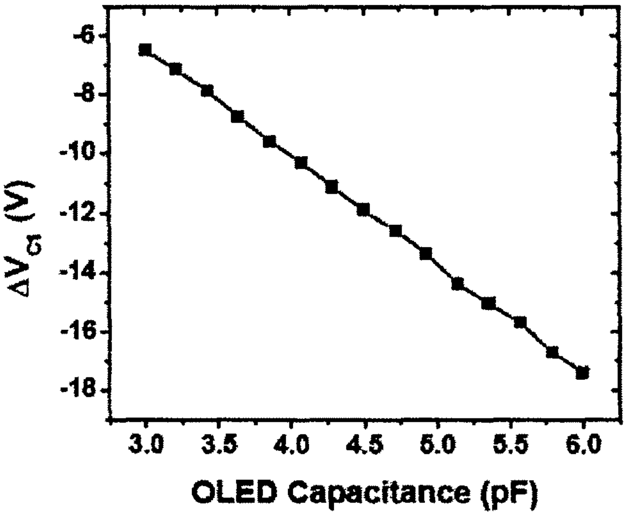
FIG. 5 is a graph illustrating the simulated change in voltage across the read capacitor using the read block circuit.

FIG. 5 shows, in a graph, the simulated change in voltage across the read capacitor 325 using the read block 315 circuit described above. From the graph it is apparent that the read block 315 may be used to determine the capacitance 210 of the pixel 200 based on the measured voltage change across the read capacitor 325.

Once the capacitance 210 of the pixel 200 is determined it may be used to determine the age of the pixel 200. As previously described, the relationship between the capacitance 210 and age of a pixel 200 may be determined experimentally for different pixel types by stressing the pixels with a given current and measuring the capacitance of the pixel periodically. The particular relationship between the capacitance and age of a pixel will vary for different pixel types and sizes and can be determined experimentally to ensure an appropriate correlation can be made between the capacitance and the age of the pixel.

The read block 315 may contain circuitry to determine the capacitance 210 of the pixel 200 from the output of the operational amplifier 320. This information would then be provided to the control block 380 for determining the current correction factor of the pixel 200. Alternatively, the output of the operational amplifier 320 of the read block 315 may be provided back to the control block 380. In this case, the control block 380 would comprise the circuitry and logic necessary to determine the capacitance 210 of the pixel 200 and the resultant current correction factor.

Figure 6:
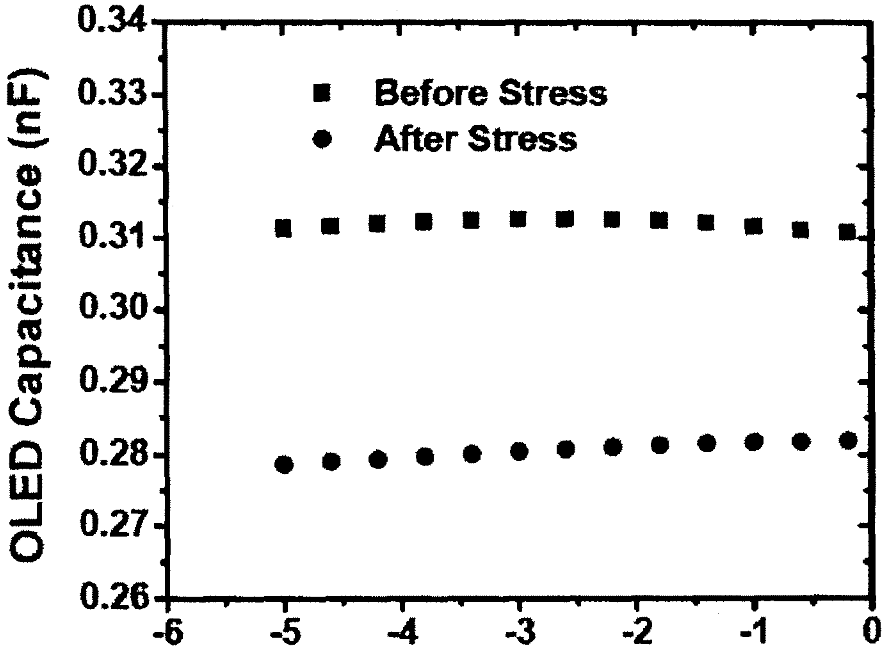
FIG. 6 is a graph illustrating the relationship between the capacitance and voltage of a pixel of different ages.

FIG. 6 shows, in a graph, the relationship between the capacitance and voltage of a pixel before and after aging. The aging was caused by stressing the pixel with a constant current of 20 mA/cm$^2$ for a week. The capacitance may be linearly related to the age. Other relationships are also possible, such as a polynomial relationship. Additionally, the relationship may only be able to be represented correctly by experimental measurements. In this case additional measurements are required to ensure that the modeling of the capacitance-age characteristics are accurate.

Figure 7:
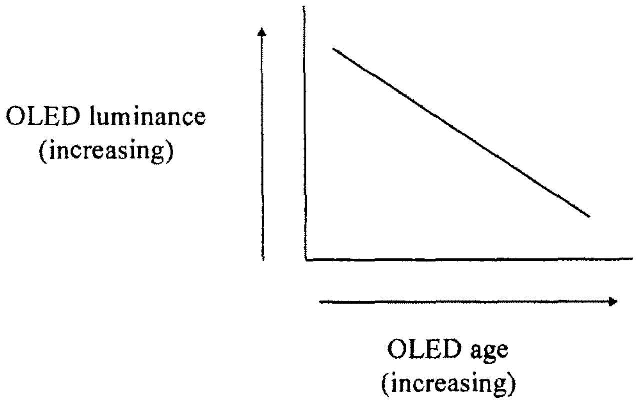
FIG. 7 is a graph illustrating the relationship between the luminance and age of a pixel.

FIG. 7 shows, in a graph, the relationship between the luminance and age of a pixel. This relationship may be determined experimentally when determining the capacitance of the pixel. The relationship between the age of the pixel and the current required to produce a given luminance may also be determined experimentally. The determined relationship between the age of the pixel and the current required to produce a given luminance may then be used to compensate for the aging of the pixel in the display.

A current correction factor may be used to determine the appropriate current at which to drive a pixel in order to produce the desired luminance. For example, it may be determined experimentally that in order to produce the same luminance in a pixel that has been aged (for example by driving it with a current of 15 mA/cm$^2$ for two weeks) as that of a new pixel, the aged pixel must be driven with 1.5 times the current. It is possible to determine the current required for a given luminance at two different ages, and assume that the aging is a linear relationship. From this, the current correction factor may be extrapolated for different ages. Furthermore, it may be assumed that the current correction factor is the same at different luminance levels for a pixel of a given age. That is, in order to produce a luminance of X cd/m$^2$ requires a current correction factor of 1.1 and that in order to produce a luminance of 2X cd/m$^2$ also requires a current correction factor of 1.1 for a pixel of a given age. Making these assumptions reduces the amount of measurements that are required to be determined experimentally.

Additional information may be determined experimentally, which results in not having to rely on as many assumptions. For example the pixel capacitance 210 may be determined at four different pixel ages (it is understood that the capacitance could be determined at as many ages as required to give the appropriate accuracy). The aging process may then be modeled more accurately, and as a result the extrapolated age may be more accurate. Additionally, the current correction factor for a pixel of a given age may be determined for different luminance levels. Again, the additional measurements make the modeling of the aging and current correction factor more accurate.

It will be appreciated that the amount of information obtained experimentally may be a trade off between the time necessary to make the measurements, and the additional accuracy the measurements provide.

Figure 8:
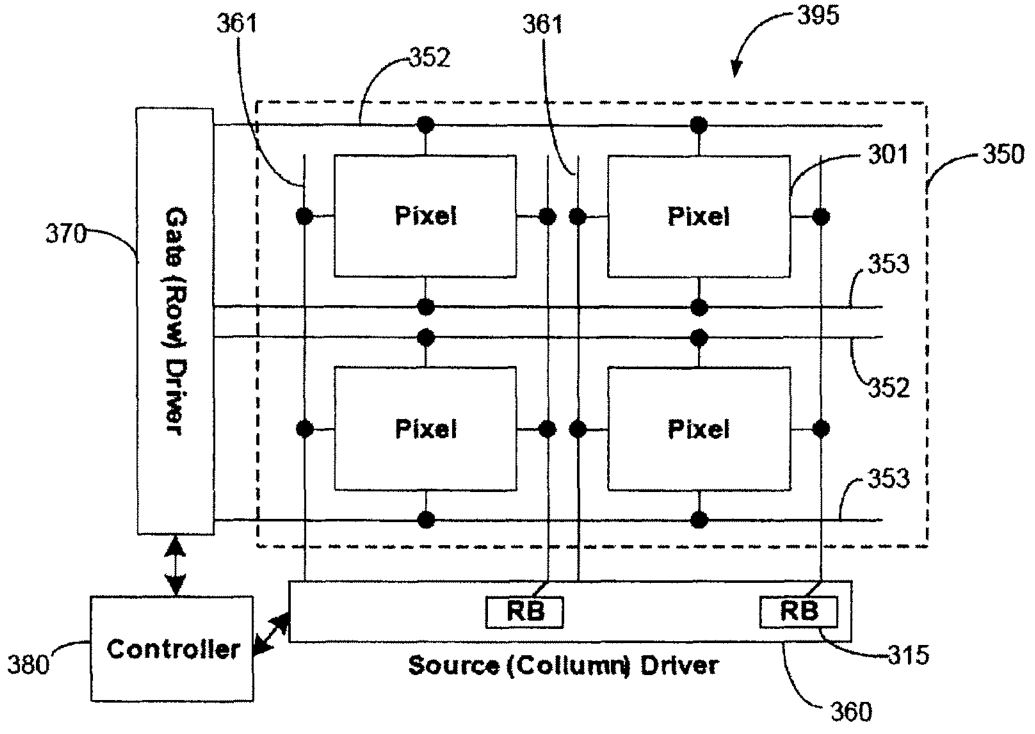
FIG. 8 is a block diagram illustrating a display.

FIG. 8 shows, in a block diagram, a display 395. The display 395 comprises a display panel 350, a row driver block 370, a column driver block 360 and a control block 380. The display panel 350 comprises an array of pixel circuits 301*b* arranged in row and columns. The pixel circuits 301*a* of the display panel 350 depicted in FIG. 8 are implemented as shown in FIG. 3*c*, and described above. In the typical display mode, transistor T3 310*b* is off and the control block 380 controls the row driver 360 so that the Read Select line 352 is driven so as to turn off transistor T3 310*b*. The control block 380 controls the row driver 370 so that the row driver 370 drives the Row Select line 353 of the appropriate row so as to turn on the pixel row. The control block 380 then controls the column drivers 360 so that the appropriate current is driven on the Column Drive line 361 of the pixel. The control block 380 may refresh each row of the display panel 350 periodically, for example 60 times per second.

When the display 395 is in the read mode, the control block 380 controls the row driver 370 so that it drives the Read Select line 352 (for turning on and off the switch, transistor T3 310) and the bias voltage of the read block 315 (and so the voltage of the Read Block line 356) for charging the capacitances to V1 and V2 as required to determine the capacitance 210 of the pixel 200, as described above. The control block 380 performs a read operation to determine the capacitance 210 of each pixel 200 of a pixel circuit 301*b* in a particular row. The control block then uses this information to determine the age of the pixel, and in turn a current correction factor that is to be applied to the driving current.

In addition to the logic for controlling the drivers 360, 370 and read block 315, the control block 380 also comprises logic for determining the current correction factor based on the capacitance 210 as determined with the read block 315. As described above, the current correction factor may be determined using different techniques. For example, if the pixel is measured to determine its initial capacitance and its capacitance after aging for a week, the control block 380 can be adapted to determine the age of a particular capacitance by solving a linear equation defined by the two measured capacitances and ages. If the required current correction factor is measured for a single luminance at each level, than the current correction factor can be determined for a pixel using a look-up table that gives the current correction factor for a particular pixel age. The control block 380 may receive a pixel's capacitance 210 from the read block 315 and determine the pixel's age by solving a linear equation defined by the two measured capacitances for the different ages of the pixel. From the determined age the control block 315 determines a current correction factor for the pixel using a look-up table.

If additional measurements of the pixel aging process were taken, then determining the age of the pixel may not be as simple as solving a linear equation. For example if three points P1, P2 and P3 are taken during the aging process such that the aging is linear between the points P1 and P2, but is exponential or non-linear between points P2 and P3, determining the age of the pixel may require first determining what range the capacitance is in (i.e. between P1-P2, or P2-P3) and then determining the age as appropriate.

The method used by the control block 380 for determining the age of a pixel may vary depending on the requirements of the display. How the control block 380 determines the pixel age and the information required to do so would be programmed into the logic of the control block. The required logic may be implemented in hardware, such as an ASIC (Application Specific Integrated Circuit), in which case it may be more difficult to change how the control block 380 determines the pixel age. The required logic could be implemented in a combination of hardware and software so that it is easier to modify how the control block 380 determines the age of the pixel.

In addition to the various ways to correlate the capacitance to age, the control block 380 may determine the current correction factor in various ways. As previously described, current correction factors may be determined for various luminance levels. Like with the age-capacitance correlation, the current correction factor for a particular luminance level may be extrapolated from the available measurements. Similar to the capacitance-age correlation, the specifics on how the control block 380 determines the current correction factor can vary, and the logic required to determine the current correction factor can be programmed into the control block 380 in either hardware or software Once a current correction factor is determined for a pixel, it is used to scale the driving current as required.

Figure 9:
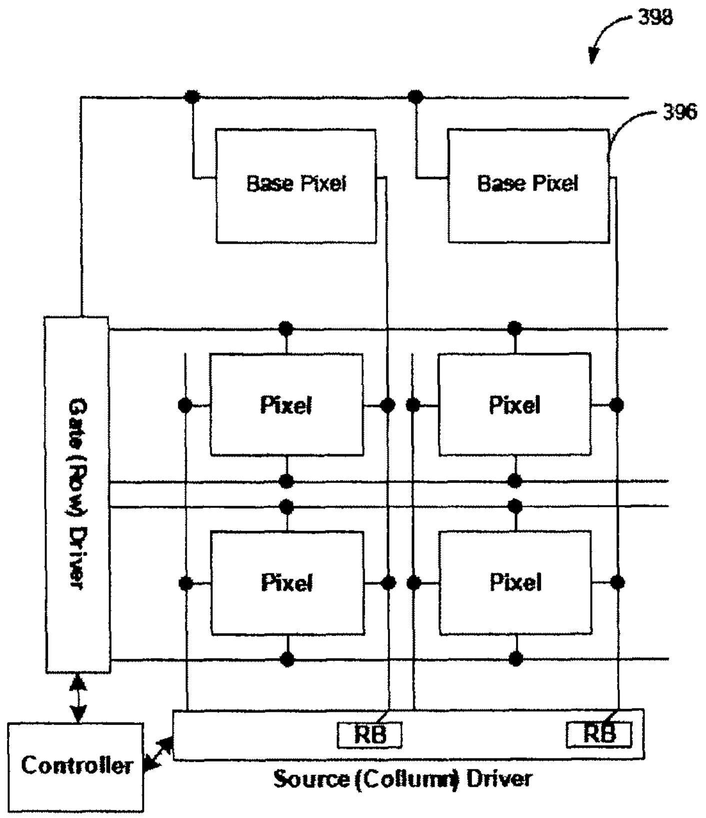
FIG. 9 is a block diagram illustrating an embodiment of a display.

FIG. 9 shows in a block diagram an embodiment of a display 398. The display 390 described above, with reference to FIG. 8, may be modified to correct for pixel characteristics common to the pixel type. For example, it is known that the characteristics of pixels depend on the temperature of the operating environment. In order to determine the capacitance that is the result of aging, the display 398 is provided with an additional row of pixels 396. These pixels 396, referred to as base pixels, are not driven by display currents, as a result they do not experience the aging that the display pixels experience. The base pixels 396 may be connected to the read block 315 for determining their capacitance. Instead of using the pixel capacitance directly, the control block 380 may then use the difference between the pixel capacitance 210 and the base capacitance as the capacitance to use when determining the age of the display pixel.

This provides the ability to easily combine different corrections together. Since the age of the pixel was determined based on a capacitance corrected to account for the base pixel capacitance, the age correction factor does not include correction for non-aging factors. For example, a current correction factor may be determined that is the sum of two current correction factors. The first may be the age-related current correction factor described above. The second may be an operating environment temperature related correction factor.

The control block 380 may perform a read operation (i.e. operate in the read mode) at various frequencies. For example, a read operation may be performed every time a frame of the display is refreshed. It will be appreciated that the time required to perform a read operation is determined by the components. For example, the settling time required for the capacitances to be charged to the desired voltage depends on the size of the capacitors. If the time is large relative to the frame refresh rate of the display, it may not be possible to perform a read each time the frame is refreshed. In this case the control block may perform a read, for example, when the display is turned on or off. If the read time is comparable to the refresh rate it may be possible to perform a read operation once a second. This may insert a blank frame into the display once every 60 frames. However, this may not degrade the display quality. The frequency of the read operations is dependent upon at least the components that make up the display and the required display characteristics (for example frame rate). If the read time is short compared to the refresh rate, a read may be performed prior to driving the pixel in the display mode.

The read block 315 has been described above as determining the capacitance 210 of a single pixel 200 in a row. A single read block 315 can be modified to determine the capacitance of multiple pixels in a row. This can be accomplished by including a switch (not shown) to determine what pixel circuit 301*b* the read block 315 is connected to. The switch may be controlled by the control block 380. Furthermore, although a single read block 315 has been described, it is possible to have multiple read blocks for a single display. If multiple read blocks are used, then the individual read blocks may be referred to as read block elements, and the group of multiple read block elements may be referred to as a read block.

Although the above description describes a circuit for determining the capacitance 210 of a pixel 200, it will be appreciated that other circuits or methods could be used for determining the pixel capacitance 210. For example in place of the voltage amplifier configuration of the read block 315, a transresistance amplifier may be used to determine the capacitance of the pixel. In this case the capacitance of the pixel and the parasitic capacitance is charged using a varying voltage signal, such as a ramp or sinusoidal signal. The resultant current can be measured and the capacitance determined. Since the capacitance is a combination of the parasitic capacitance 330 and the pixel capacitance 210, the parasitic capacitance 330 must be known in order to determine the pixel capacitance 210. The parasitic capacitance 330 may be determined by direct measurement. Alternatively or additionally the parasitic capacitance 330 may be determined using the transresistance amplifier configuration read block. A switch may disconnect the pixel circuit from the read block. The parasitic capacitance 330 would then be determined by charging it with a varying voltage signal and measuring the resultant current.

The embodiments described herein for compensating for the luminance degradation of pixels due to electrical aging can be advantageously included in a display panel without decreasing the yield, aperture ratio or resolution of the display. The electronics required to implement the technique can easily be included in the electronics required by the display without significantly increasing the display size or power requirements.

One or more currently illustrated embodiments have been described by way of example. It will be apparent to persons skilled in the art that a number of variations and modifications can be made without departing from the scope of the invention as defined in the claims.

What is claimed is:

1. A method of compensating for luminance degradation of a pixel having a luminescent device, the method comprising:

determining a luminance degradation resulting from aging of the pixel;

determining based on the determined luminance degradation a current correction factor;

compensating a drive current for the luminescent device based on the current correction factor; and driving the luminescent device with the compensated drive current.

2. The method of claim 1, wherein the current correlation factor is an absolute amount of current to be added to the drive current.

3. The method of claim 1, wherein the current correction factor is a multiplier by which the drive current is multiplied in connection with the compensating.

4. The method of claim 1, wherein the current correction factor is retrieved from a lookup table that correlates desired luminance values with compensated driving currents, the lookup table being stored in a memory device.

5. The method of claim 1, wherein the luminance degradation is determined by a read block connected to the pixel by a switch, the read block reading a characteristic of the pixel or of the luminescent device when the switch is closed.

6. The method of claim 5, wherein the characteristic is a capacitance.

7. The method of claim 5, further comprising deducting a voltage caused by a leakage current caused by the read block so that the current correction factor is not influenced by the leakage current.

8. The method of claim 1, wherein the current correction factor is determined based on a plurality of current correction factors, wherein a first of the current correction factors is an age-related current correction factor related to the aging of the pixel and another of the current correction factors is a temperature-related correction factor relating to an environmental temperature.

9. A method of compensating a drive current of a pixel, the method comprising:

determining a combined correction factor that is based on an age-related correction factor and a non-age-related correction factor;

compensating a drive current for the pixel based on the combined correction factor; and driving the pixel with the compensated drive current.

10. The method of claim 9, where the combined correction factor is a sum of the age-related correction factor and the non-age-related correction factor, the non-age-related correction factor being a temperature-related correction factor.

11. The method of claim 10, further comprising:

prior to the determining the combined correction factor, determining a luminance degradation of the pixel resulting from aging of the pixel;

determining, based on the determined luminance degradation, the age-related correction factor; and determining, based on an operating environment temperature, the temperature-related correction factor.

12. The method of claim 11, wherein the pixel is an organic light emitting diode (OLED).

13. The method of claim 12, wherein the determining the luminance degradation of the pixel includes determining a capacitance of the OLED.

14. The method of claim 11, wherein the pixel is one of a plurality of pixels arranged in an array to form a display device.

15. The method of claim 11, further comprising updating the determined luminance degradation of the pixel more than once during a lifetime of the pixel so as to account for ongoing aging degradation during the lifetime of the pixel.

16. The method of claim 14, further comprising:

determining a capacitance of the pixel during a read operation of the display device, the pixel having been aged by use of the pixel to selectively emit light during a display operation of the display device;

determining a capacitance of a base pixel of the display during the read operation, the base pixel not having been used to selectively emit light during the display operation; and the determining the luminance degradation of the pixel resulting from aging of the pixel comprises using a difference between the determined capacitance of the pixel and the determined capacitance of the base pixel.

17. The method of claim 16, wherein the pixel is an organic light emitting diode (OLED).

* * * * *